July 30, 1963   T. J. SLAWIN   3,099,077
WHEEL PULLER
Filed Dec. 16, 1958   2 Sheets-Sheet 1
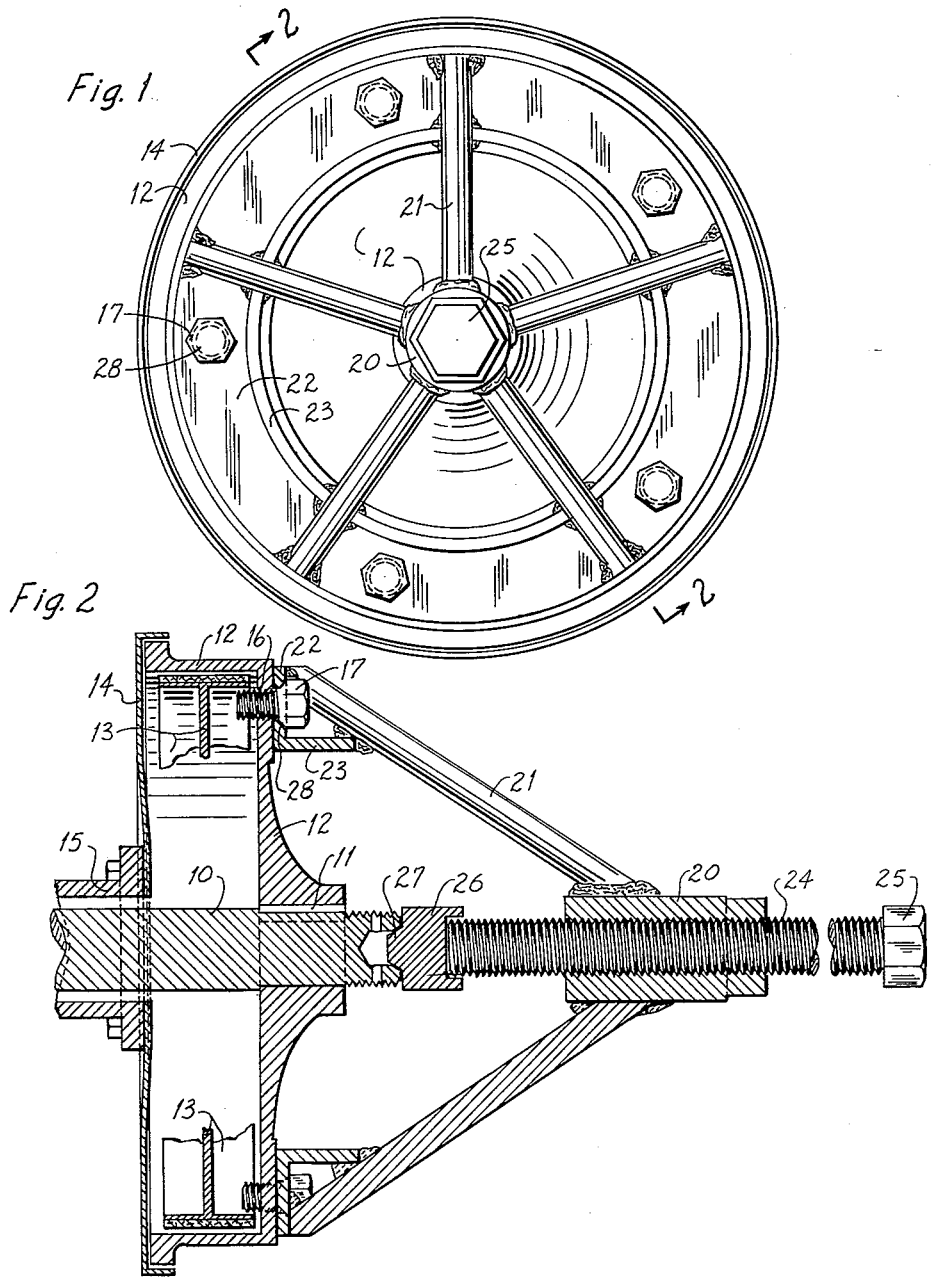
Theodore J. Slawin
INVENTOR.
BY A. T. Sperry
ATTORNEY

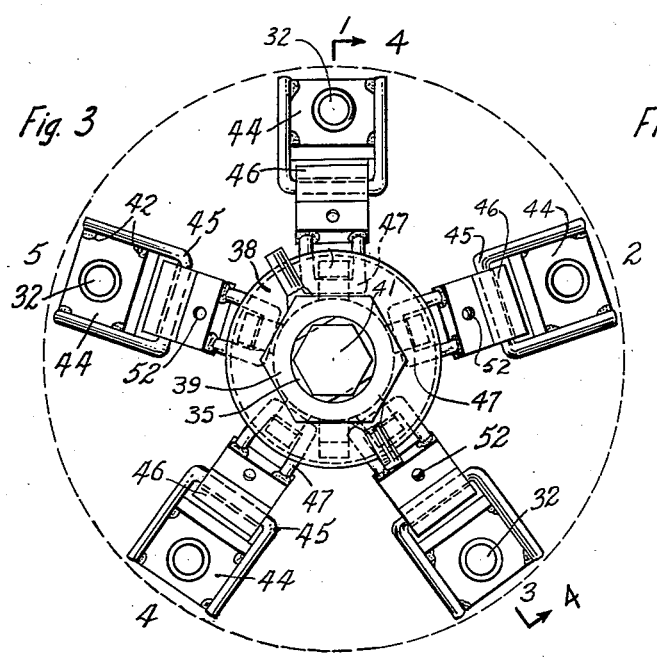
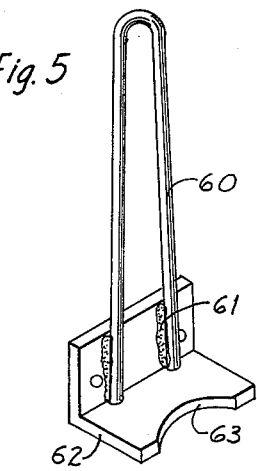
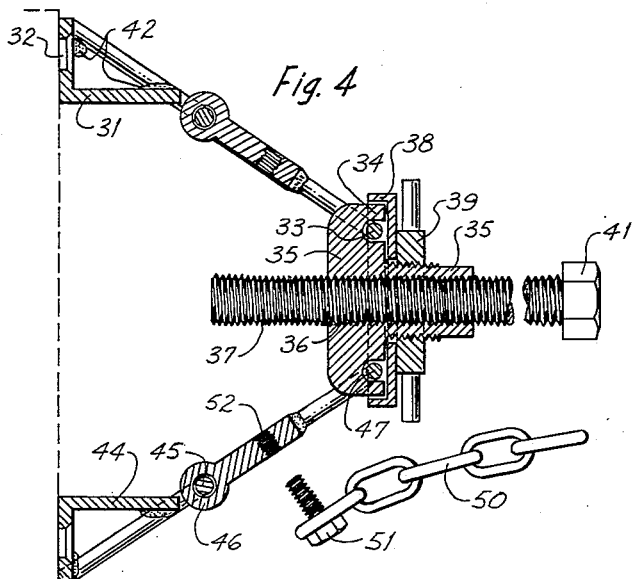
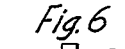
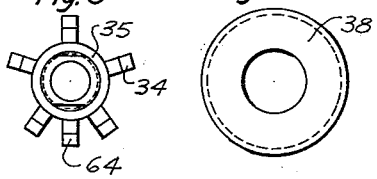
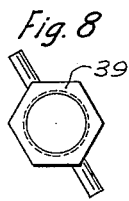
Theodore J. Slawin
INVENTOR.
BY A. T. Sperry
ATTORNEY United States Patent Office 3,099,077
Patented July 30, 1963

3,099,077
WHEEL PULLER
Theodore J. Slawin, Rte. 3, Box 203, Tampa, Fla.
Filed Dec. 16, 1958, Ser. No. 780,863
1 Claim. (Cl. 29—261)

This invention relates to pullers or thrust devices particularly adapted for the removal of wheels or like objects from their shafts, bearings or other supports. Specifically, those forms of the present invention here shown by way of illustration, are designed for the removal of the housing wheel of motor vehicle axles which encase the brake mechanism and which are provided with threaded studs to receive the tire disk.

While the removal of such inner vehicle wheels may not present difficult problems in many current types of American made automobiles, difficulties are experienced in removing such wheels from certain types of foreign made motor vehicles where the stud bolts for securing the tire disk are short and where such wheels are snugly, if not press fitted, upon long splined supporting axles. A common expedient in wheel pullers of the prior art, is to provide wheel engaging arms which encompass the periphery of the wheel and extend therebehind to exert outward thrust on the wheel while a central member engages and produces a counter thrust against the axle. However, in certain makes of vehicles, an appropriate grasp of the periphery of the wheel is not easily secured and the pull exerted may be disproportioned about the periphery so as to cant the wheel, precluding its withdrawal from the shaft and/or mutilating the axle, or the wheel itself.

The present mechanism provides for engagement of the wheel through the conventional stud bolts normally securing the tire bearing disk, thus to insure a uniform outward tension to preclude any misalignment as the wheel is withdrawn from its shaft or axle. The invention further provides the utmost in simplicity of construction and operation and hence, improved economy of manufacture. In one form of the invention, a single rigid ring is provided for engagement with the disk holding studs to be secured by the normal stud nuts, the ring being rigidly secured as by welding to a central thrust member actuated by threaded means to engage the axle and exert pulling tension. In another form of the present invention, the arms are pivotally mounted from the central threaded thrust member and each is provided with an individual lug engaging member. In this form of the invention, the arms may be folded to collapse the structure to take up minimum space in storage, while still maintaining the essential feature of uniform pull of the wheel through its stud bolts.

From the foregoing, it will be seen that the objects of the present invention include that of providing a novel, simple and improved wheel puller, particularly designed for extracting a wheel from a shaft by exertion of thrust through the normal disk holding stud bolts of the wheel. Numerous other objects, features and advantages of the present invention will be apparent from a consideration of the following specification taken in conjunction with the accompanying drawings, in which FIGURE 1 is a plan view of one form of the present invention;

FIGURE 2 is a central section to that form of the invention shown in FIGURE 1;

FIGURE 3 is a plan view of another form of the invention, the right-hand side being broken away to illustrate modified forms of the wheel engaging members;

FIGURE 4 is a central section through that form of the invention shown in FIGURE 3, the modified engaging members being illustrated in section as the lower portion of the figure;

FIGURE 5 is a prospective view of a further modified form of engaging member;

FIGURE 6 is a plan view of the head of the device of FIGURES 3 and 4;

FIGURE 7 is a plan view of the arm securing disk of the device of FIGURES 3 and 4; and FIGURE 8 is a plan view of the securing nut for the head and disk.

While the present invention is here defined as a wheel puller, and is essentially designed for pulling brake drum wheels of the type which house the brake mechanism of motor vehicles, it will be understood that the term wheel is to be liberally construed, the device being also adapted for the pulling of gears, bearings and like objects. In that form of engaging means shown in FIGURE 5, for instance, means are provided which permit the operation of the device for the pulling of gears, bearings and like objects. In that form of engaging means shown in FIGURE 5, for instance, means are provided which permit the operation of the device for pulling bearings or gears by engagement over the edges thereof. The head member of that form of the invention shown in FIGURES 3, 4 and 6 is specifically designed to permit the application of opposite pairs of pulling devices as distinct from a circular arrangement of a greater plurality of pulling elements as shown in FIGURES 3 and 4.

As an illustration of one practical use of the invention, FIGURES 1 and 2 indicate a motor vehicle axle shaft by the numeral 10 to which there is keyed or splined by the keyway 11, a conventional brake drum housing wheel 12. The brake mechanism is indicated fragmentarily at 13 and is enclosed by a conventional internal cover 14 supported from the axle housing generally indicated at 15. The stud bolts which normally retain the tire bearing disk on the brake drum wheel 12 are indicated by the numeral 16. The heads 17, normally retain the tire bearing disk against the outer peripheral face of the drum 12. Such heads 17 operating with the pulling mechanism of the present invention exert the outward pulling tension for removal of the wheel 12 from the shaft 10. It will, of course, be understood that this structure, thus set forth, is purely conventional and forms no part of the present invention and that while the present device is particularly adapted for the removal of brake drum wheels of the type illustrated, various types of wheels, pulleys and bearings may be removed with the apparatus of the present invention.

The wheel puller of FIGURES 1 and 2 is a rigid structure including a central internally threaded head 20 with five outwardly inclined rigid arms 21 welded thereto. The arms 21 at the outer ends engage, by rigid welding, a solid pull ring having a flat annular flange 22 disposed in a plane normal to the axis of the head 20 and thus adapted to lay flat against the outer peripheral edge of a wheel such as the brake drum wheel 12. The ring is L-shaped in cross-section, thus provided with an inner flange 23 disposed in a circular plan coaxial with the base of the head 20. For exerting outward tension, there is provided a threaded bolt 24 with a head 25 adapted to receiving a suitable turning tool and an inner freely rotatable thrust element 26, preferably formed with a frusto-conical end 27 adapted to be received within the conventional outer recess of an axle shaft 10.

In the use of that form of the invention illustrated in FIGURES 1 and 2, it will, of course, be understood that in pulling the brake drum wheel 12 from the axle 10, the tire bearing disk, not shown, is first removed by the removal of the stud bolts 16. Thereafter, the flat outer face of the flange 22 of the wheel puller is applied against the peripheral outer face of the drum. Flange 22 is provided with apertures 28 which are aligned with the threaded bolt receiving apertures of the drum and the bolts 16 are then secured through the flange 22 to the drum 12, their heads 17 engaging the outer face of flange 22. As will be noted, the apertures 28 are of conical form to fit the frusto-conical portion of the bolt 16 adjacent the heads 17. After securement of the flange 22, the bolt 24 is threaded inwardly to urge the freely rotatable thrust element 26 against the outer end of the axle shaft 10. Thereafter, by continuous rotation of the bolt 24, inward pressure is exerted against the shaft while outward pull is exerted by the flange 22 against the head 17 of the bolt 16 and thus the drum is drawn off the shaft 10 and free of the keyway 11. After withdrawal from the shaft 10, the brake drum wheel 12 may be readily disengaged from the puller by disengagement of the bolts 16, all of which will be clearly understood by those skilled in the art.

In that form of the invention shown in FIGURES 3 and 4, arms 30, of generally U-shaped form are provided at their outer ends with welded transversely L-shaped pull plates 31, defining apertures 32 for the reception of the stud bolts. At the inner opposite ends, the arms 30 are formed with return bends 33, adapted to be pivotally received over outwardly projecting retention fingers 34 of a central thrust head 35. The head 35 is provided with a central threaded bore 36 for the threaded adjustment therethrough of a pressure bolt 37. For retaining the return bent end portion 33 of the arms 30, in the recesses formed behind the fingers 34, a circular dish-shaped retention plate 38, is provided which fits over the outer periphery of the fingers and which is retained in position, to prevent inadvertent displacement of the arms, by a securing nut 39 threaded over an externally threaded outer shank 40 of the head 35.

In the operation of this form of the invention, it will be understood that the arms are pivoted to a position whereby their apertures 32 register with the stud bolt apertures or stud bolts of a brake drum such as indicated in FIGURE 2 by the numeral 12. The plates 31 are then firmly engaged against the drum by the stud bolts or by nuts engaged over stud bolts. The pressure bolt 37 is then turned to move the bolt axially toward the axle supporting the wheel to be pulled by engagement of a suitable wrench on its head 41. Thus, in the manner already described with respect to the structure of FIGURES 1 and 2, counter pressure is supplied inwardly by the bolt and outwardly by the plates to dislodge a wheel from its shaft.

While the plates 31, on the left-hand side of FIGURE 3 and at the top of FIGURE 4 are shown as rigidly welded at 42 to the arms 30, the invention contemplates pivotally mounted plates 44 as illustrated in the broken portion to the right of FIGURE 3 and at the lower portion of FIGURE 4. Such plates 44 include an inwardly extended link 45 adapted to be pivotally engaged over the fingers as at 47 in the manner of the engagement of the return bent portion 33 of the arms 30. With such arrangement, it will be seen that the additional pivotal movement adjacent the point of application of pull will assist in a uniformity of pressure to preclude canting of the wheel as it is removed from its shaft. This form of tension unit may also be applied to the head 35 by the use of a chain illustrated in FIGURE 4 by the numeral 50, the outer link of the chain may be engaged to the body of the arm 46 through a bolt 51 threadedly engaging a bore 52 of the arm. The opposite end of the chain may then be placed over the fingers so as to provide a pulling unit wherein the head is a substantial distance from the wheel. It will, of course, be understood that in the use of the chain, the inner end 47 of the arm is disengaged from the head 35, a link of the chain being fitted over the fingers 34 in lieu of the inner end of the arm 46.

The present invention further contemplates the use of a pull member of the form shown in FIGURE 5, having arms 60 similar to the arms 30 of FIGURE 3 to be pivotally engaged with the head. The inner ends of the arms 60 are welded or otherwise secured, preferably rigidly as at 61 to L-shaped plates 62 which are formed with internally curved recesses 63 so that the plates may be placed behind a gear or bearing with the recess 63 encompassing the shaft but permitting the outward pull to remove a gear or bearing from its shaft.

As more clearly depicted in FIGURE 6, it will be noted that the head 35 is preferably provided with five equally distributed circularly arranged fingers 34 and with one additional finger 64 placed diametrically opposite one of the fingers 34. By this arrangement, it will be seen that, if desired, only two arms may be used in the pulling of a wheel, gear or bearing from its shaft. The opposite disposition of finger 64 permits the arms to be arranged in diametrically opposed position to provide for the application of opposite tensions against a wheel.

From the foregoing, it will be seen that the present invention provides a novel, simple and improved wheel puller. In one form, the rigid structure insured uniformity of pressure and a simplicity of construction materially contributing to economy of manufacture. In the second form of the invention, the pivoted arrangement of the arms permits the device to be collapsed for storage. The alternative types of pull exerting members provide a universal apparatus which may be used in a wide variety of operations for the removal of a wheel, gear, bearing or the like from their supports. It will, of course, be understood that in the practice of the invention, numerous changes, modifications and the full use of equivalents may be resorted to without departure from the spirit or scope of the invention as set forth in the appended claim.

What I claim is:

A wheel puller of the character set forth, including an internally threaded thrust head defining a plurality of radially projecting retention fingers, a plurality of U-shaped arms having return bent end portions, said return bent portion of each arm being mounted on one of said fingers, a cap engaging said return bent portions for retaining said portions in engagement with said fingers, releasable threaded means on said head for retaining said cap against said return bent portions, means carried by the opposite ends of said arms for engaging wheel stud nuts, said means including pivotally mounted L-shaped extensions of said arms each defining a stud encircling aperture, and a threaded pressure bolt threadedly engaged through the internally threaded thrust head, whereby pressure may be exerted thereby against an axle shaft to outwardly tension said arms for removing a wheel carrying said stud nuts from its axle shaft.

References Cited in the file of this patent

UNITED STATES PATENTS

| | | |
|---|---|---|
| 1,412,058 | Johnson | Apr. 11, 1922 |
| 1,479,441 | Anderson | Jan. 1, 1924 |
| 1,488,020 | Malone | Mar. 25, 1924 |
| 1,881,703 | Langdon | Oct. 11, 1932 |
| 1,986,588 | Manning et al. | Jan. 1, 1935 |
| 2,461,983 | Jarrett | Feb. 15, 1949 |

FOREIGN PATENTS

| | | |
|---|---|---|
| 664,000 | France | Apr. 16, 1929 |
| 608,614 | Germany | Jan. 28, 1935 |
| 216,352 | Great Britain | May 29, 1924 |
| 309,717 | Great Britain | Apr. 18, 1929 |
| 780,195 | Great Britain | Jan. 31, 1957 |